Nov. 23, 1937.  E. MONTGOMERY  2,100,261
LUGGAGE RACK
Filed Sept. 28, 1936
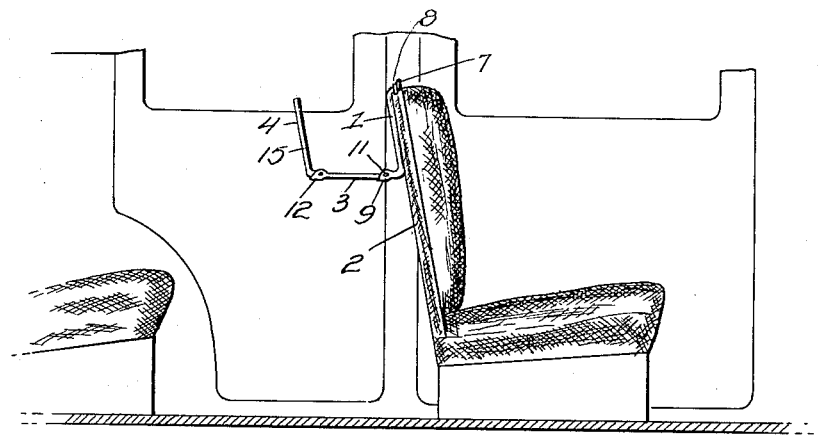
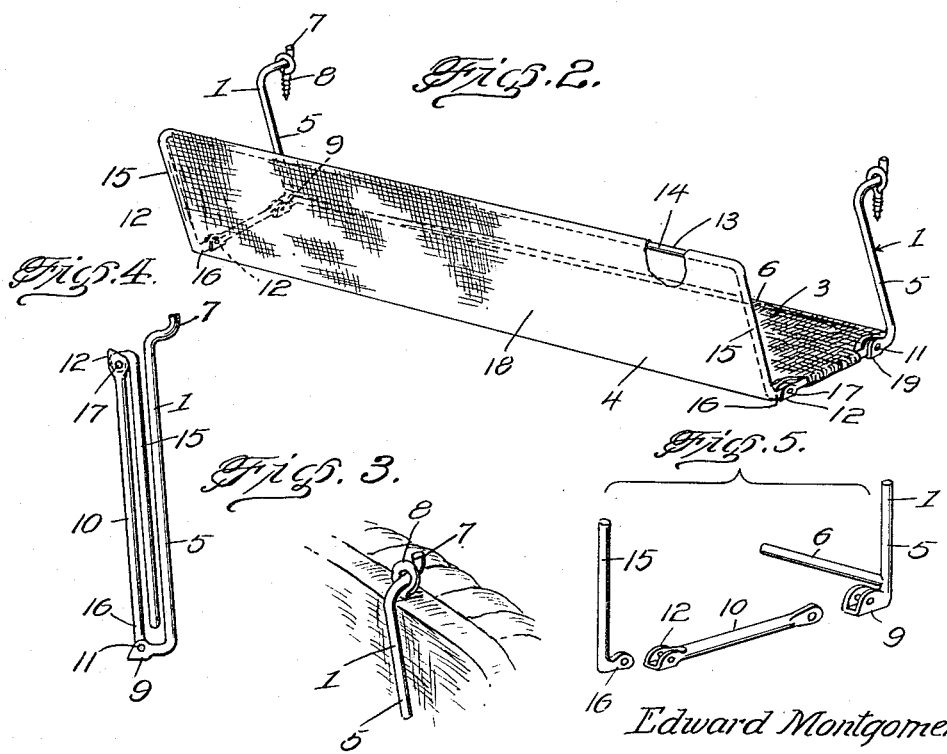
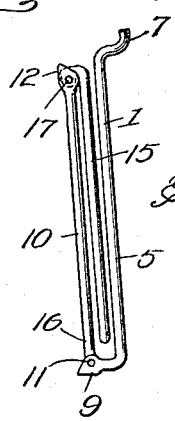
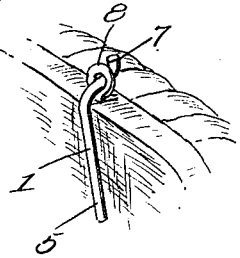
Edward Montgomery,
INVENTOR
BY Victor J. Evans & Co.
ATTORNEYS Patented Nov. 23, 1937

2,100,261

UNITED STATES PATENT OFFICE 2,100,261

LUGGAGE RACK

Edward Montgomery, Knoxville, Tenn.

Application September 28, 1936, Serial No. 103,007

1 Claim. (Cl. 224—29)

My invention relates to improvements in luggage racks for use in automobiles to hold coats, hats, robes, or the like, and the primary object thereof is to provide a simply constructed practical device of this class which is readily attachable to an automobile seat to hang over the back thereof, to contain a number of articles such as above-mentioned and which, when not in use, is foldable into compact form against the back of the seat, so that it will occupy a minimum amount of space.

Another object is to provide a rack of the character and for the purpose above specified, which is light in weight, strong and durable, economical to manufacture, and readily attachable to and detachable from automobile seats of standard construction without damaging the same or necessitating modification thereof.

Other objects, together with the exact nature of my improvements and the advantages thereof, will become apparent as the following description is developed and upon reference to the drawing accompanying and forming part of this specification.

In said drawing:

Figure 1 is a fragmentary view in vertical section of parts of an automobile illustrating the manner in which my improved rack is attached to one of the seats thereof.

Figure 2 is a view in perspective of the rack unfolded.

Figure 3 is a fragmentary view in perspective illustrating in detail the manner in which the rack is attached to the seat.

Figure 4 is a view in end elevation of the rack folded, and

Figure 5 is a fragmentary disassembled view in perspective illustrating hinge connections for different parts of the rack.

Describing the invention in detail with reference to the drawing, my improved rack comprises a hanger frame 1 for attachment to the front seat 2 of an automobile, to depend from the upper edge thereof, and a pair of bottom and side panels 3 and 4, respectively, the first hinged to the hanger frame 1 and each to the other to extend in angular relation, with the side panel 4 opposed to the hanger frame 1 and forming, together with the back of the seat 2, a trough-like container open at both ends.

The hanger frame 1 comprises a pair of rod-like end arms 5 connected together at their lower ends by a cross rod 6. The end arms 5 have upwardly directed ends 7 designed to interlock with eye bolts, or screws 8, inserted into the upper edge of the seat 2 of the automobile and to suspend said frame 1 alongside the back of said seat. The lower ends of the arms 5 are bent outwardly and formed with hinge sockets, as at 9.

The bottom panel 3 comprises a pair of rod-like end arms 10 pivoted at one end, as at 11, to said sockets 9 and forming, together with the latter, rule hinges between the bottom panel 3 and the frame 1. The opposite ends of the arms 10 are provided with sockets 12, similar to the sockets 9. The side panel 4 includes a single piece rod-like frame 13 comprising an upper cross rod 14 and end arms 15 provided with lower inwardly bent ends 16 pivoted to the sockets 12, as at 17, and forming, together with said sockets, rule hinges between the side panel 4 and the front panel 3. A single piece of upholstery cloth 18, or other material, secured at its edges in any suitable manner to the frame 13, the arms 10 and the rod 6, completes the panels 3 and 4.

As will be clear, the described hinge connections are such that the panels 3 and 4 unfold to a limited extent into angular relation to each other and the panel 3 in angular relation to the frame 1, and permit the side panel 4 to move downwardly over the bottom panel 3 and the two panels to be folded on the frame 1 into upstanding position close to the back of the seat 2. Any suitable form of device may be used for holding the rack in folded position. The shape of the angled ends 7 of the arms 5 is such that by tilting the rack upwardly in the eye bolts 8, said arms may be easily withdrawn from said eye bolts and the rack detached from the seat for storage or other purposes. The frames 1 and 13, together with the side arms 10, may be formed of any suitable light metallic material, either solid or tubing, for instance, aluminum.

The described rack is illustrative of a preferred embodiment of my invention only and right is herewith reserved to modifications of structural details described falling within the scope of the claim appended hereto.

What I claim is:

A luggage rack comprising a hanger frame adapted to be attached to the front seat of an automobile to depend from the upper edge thereof, bottom and side panels respectively, the first hinged to the hanger frame and each to the other to extend in angular relation, with the side panel opposed to the hanger frame and forming together with the back of the vehicle seat a trough-like container open at both ends, the hanger frame comprising a pair of end arms connected together at their lower ends by a cross rod, the end arms having upwardly directed ends for attachment to said vehicle seat and adapted to suspend said frame along side the back of said seat, the lower ends of the arms being bent outwardly and being formed with hinge sockets, said bottom panel comprising a pair of end arms pivoted at one end to said sockets and forming together with the latter rule hinges between said bottom panel and said frame, the opposite ends of the bottom panel arms being provided with sockets, said side panel comprising a single piece rod frame comprising an upper cross rod and end arms provided with lower inwardly bent ends pivoted to the last named sockets and forming together with said sockets rule hinges between said side panel and said front panel, and a single piece of upholstery cloth secured at its edges to the cross rod of the hanger frame, to the end rods of the bottom panel, and to the rod-like frame of the side panel, said hinge connections permitting of the bottom panel and side panel unfolding to a limited extent in angular relation to each other and to the hanger frame and permitting the side panel to swing downwardly over the bottom panel and the two panels to be folded on the hanger frame in upstanding position close to the back of said seat.

EDWARD MONTGOMERY.